US012722939B2

(12) United States Patent
Vishal

(10) Patent No.: US 12,722,939 B2
(45) Date of Patent: Sep. 1, 2026

(54) APPARATUS TO PROTECT A PNEUMATIC VACUUM ELEVATOR FROM AN OVERLOAD CONDITION

(71) Applicant: Ruphavathy Vishal, Chennai (IN)

(72) Inventor: Ruphavathy Vishal, Chennai (IN)

(73) Assignee: Ruphavathy Vishal (IN)

( * ) Notice: Subject to any disclaimer, the term of this patent is extended or adjusted under 35 U.S.C. 154(b) by 0 days.

(21) Appl. No.: 18/293,370

(22) PCT Filed: Jan. 25, 2024

(86) PCT No.: PCT/IB2024/050690

§ 371 (c)(1),
(2) Date: Jan. 30, 2024

(87) PCT Pub. No.: WO2025/062187

PCT Pub. Date: Mar. 27, 2025

(65) Prior Publication Data

US 2026/0184537 A1 Jul. 2, 2026

(30) Foreign Application Priority Data

Sep. 21, 2023 (IN) ............................ 202341063579

(51) Int. Cl.
*B66B 5/14* (2006.01)
*B66B 9/04* (2006.01)

(52) U.S. Cl.
CPC . *B66B 5/14* (2013.01); *B66B 9/04* (2013.01)

(58) Field of Classification Search
None
See application file for complete search history.

(56) References Cited

U.S. PATENT DOCUMENTS

| | | | | |
|---|---|---|---|---|
| 10,106,375 | B1 | 10/2018 | Ascua et al. | |
| 11,845,633 | B2 * | 12/2023 | Babu | B66B 5/14 |
| 12,091,288 | B2 * | 9/2024 | Babu | G05D 16/204 |
| 12,264,040 | B2 * | 4/2025 | Babu | B66B 11/004 |

FOREIGN PATENT DOCUMENTS

| | | | | | |
|---|---|---|---|---|---|
| CN | 104401851 | A | | 3/2015 | |
| CN | 104724570 | A | * | 6/2015 | B66B 5/14 |
| CN | 204549763 | U | * | 8/2015 | |
| IN | 202041023095 | A | | 6/2020 | |
| WO | 2023002298 | A1 | | 1/2023 | |

* cited by examiner

*Primary Examiner* — Diem M Tran
(74) *Attorney, Agent, or Firm* — Jason C. Cameron

(57) ABSTRACT

An apparatus 10 to protect a pneumatic vacuum elevator 20 from an overload condition is provided. The apparatus includes a vacuum control unit 30 connected to a top cylinder 50 through pipes. The pipes are to function as at least an inlet and an outlet with respect to the top cylinder. The vacuum control unit includes vacuum motors to suck air from the top cylinder through the pipes to move a cabin placed inside the vertically stacked cylinders in an upward direction. The vacuum control unit includes a flow controller to introduce air into the top cylinder through the pipes to move the cabin in a downward direction. The apparatus also includes an overload tripper to isolate the vacuum motors and the flow controller from a power source when weight of the cabin exceeds a predefined threshold.

10 Claims, 7 Drawing Sheets

APPARATUS TO PROTECT A PNEUMATIC VACUUM ELEVATOR FROM AN OVERLOAD CONDITION

CROSS-REFERENCE TO RELATED APPLICATION

This Application claims priority from a Complete Patent application filed in India having Patent Application No. 202341063579, filed on Sep. 21, 2023, and titled "AN APPARATUS TO PROTECT A PNEUMATIC VACUUM ELEVATOR FROM AN OVERLOAD CONDITION" and a PCT Application No. PCT/IB2024/050690 filed on Jan. 25, 2024, and titled "AN APPARATUS TO PROTECT A PNEUMATIC VACUUM ELEVATOR FROM AN OVERLOAD CONDITION."

FIELD OF INVENTION

Embodiments of the present disclosure relate to a field of elevators and more particularly to an apparatus to protect a pneumatic vacuum elevator from an overload condition.

BACKGROUND

An elevator is a machine which transports people and freights between different levels of a structure. The structure includes a building, a maritime vessel and the like. The elevator is classified as a cable-assisted elevator, a hydraulic cylinder-assisted elevator, and a pneumatic vacuum elevator based on an actuation method of a cabin of the elevator. In the cable assisted elevator, the cabin is actuated by cables attached to the cabin. In the hydraulic cylinder-assisted elevator, the cabin is actuated by hydraulic pistons associated with the cabin. The pneumatic vacuum elevator utilizes vacuum created in an external cylinder to move the cabin through the external cylinder.

The external cylinder is constructed by stacking up one or more identical cylinders. Conventionally, a vacuum control unit is positioned on top of the external cylinder to control the vacuum inside the external cylinder. Placement of the vacuum control unit on top of the external cylinder makes installation of the pneumatic vacuum elevator difficult in locations that lack overhead space. Further, vacuum control unit fails to stop the pneumatic elevator from functioning in case of an overload, thereby increasing risks of accidents. Furthermore, the vacuum control unit is sluggish to ensure landing of the cabin at predefined floor levels by controlling the vacuum inside the external cylinder.

Hence, there is a need for an improved apparatus to protect a pneumatic vacuum elevator from an overload condition to address the aforementioned issue(s).

OBJECTIVE OF THE INVENTION

An objective of the invention is to provide an apparatus to protect a pneumatic vacuum elevator from an overload condition by restricting entry of air into an external cylinder of the pneumatic vacuum elevator when weight of a cabin placed inside the external cylinder exceeds a predefined threshold.

BRIEF DESCRIPTION

In accordance with an embodiment of the present disclosure, an apparatus to protect a pneumatic vacuum elevator from an overload condition is provided. The apparatus includes a vacuum control unit positioned adjacent to one or more vertically stacked cylinders of the pneumatic vacuum elevator. The vacuum control unit is connected to a top cylinder of the one or more vertically stacked cylinders through one or more pipes. The one or more pipes are adapted to function as at least an inlet and an outlet with respect to the top cylinder. The vacuum control unit includes one or more vacuum motors adapted to suck air from the top cylinder through the one or more pipes to move a cabin placed inside the one or more vertically stacked cylinders in an upward direction by creating a vacuum inside the one or more vertically stacked cylinders. The vacuum control unit also includes a flow controller adapted to introduce air into the top cylinder through the one or more pipes to move the cabin in a downward direction. The apparatus also includes an overload tripper positioned adjacent to the flow controller. The overload tripper is adapted to isolate the one or more vacuum motors and the flow controller from a power source when weight of the cabin exceeds a predefined threshold, thereby protecting the pneumatic vacuum elevator from the overload condition. The apparatus further includes a plurality of cutouts located adjacent to the overload tripper and positioned on the vacuum control unit. The plurality of cutouts are adapted to enable bidirectional flow of the air between the one or more pipes and an external environment to support a motion of the cabin in at least one of the upward direction and the downward direction.

To further clarify the advantages and features of the present disclosure, a more explicit description of the disclosure will follow by reference to specific embodiments thereof, which are illustrated in the appended figures. It is to be appreciated that these figures depict typical embodiments of the disclosure and are therefore not to be considered limiting in scope. The disclosure will be described and explained with additional details with the appended figures.

BRIEF DESCRIPTION OF THE DRAWINGS

The disclosure will be described and explained with additional specificity and detail with the accompanying figures in which.

Figure 1:
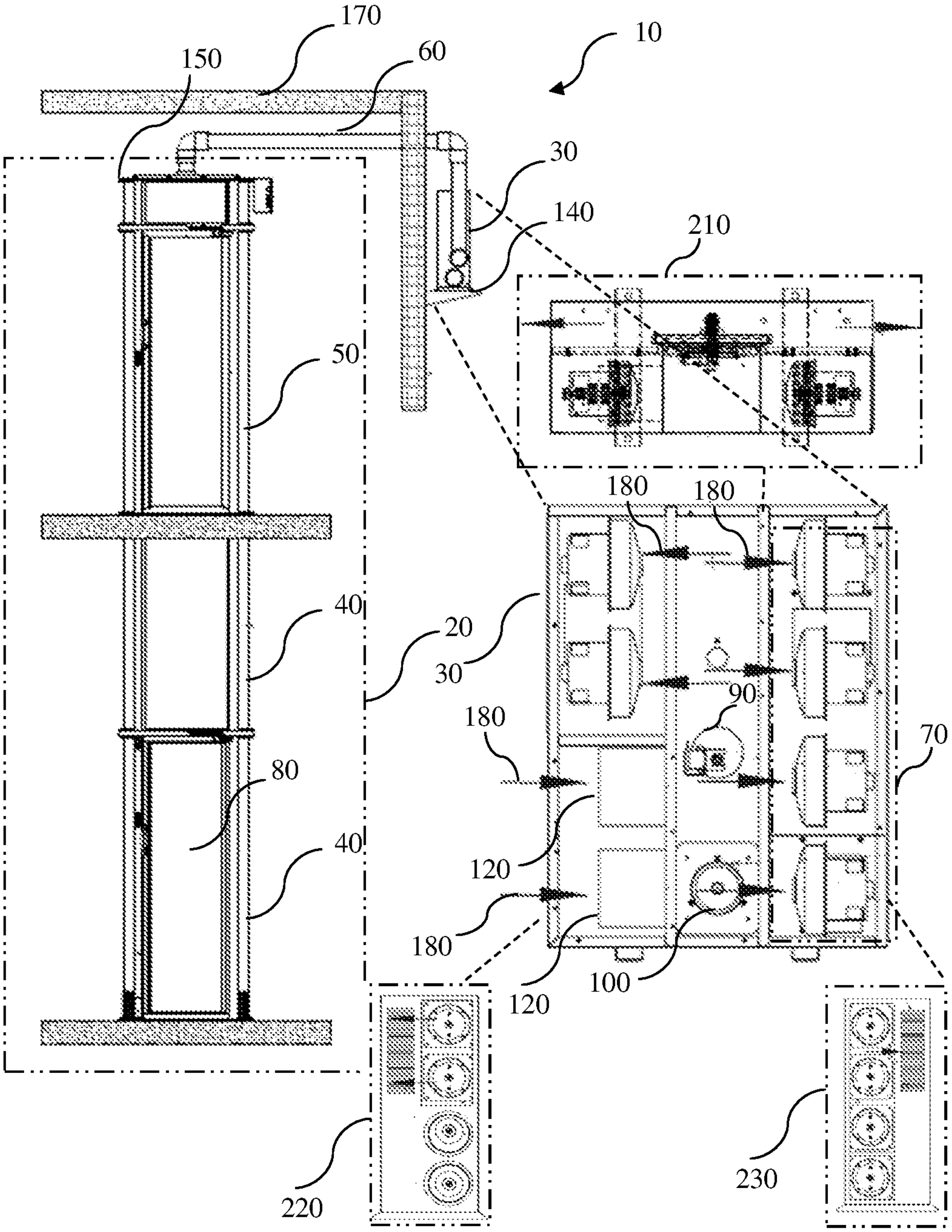
FIG. 1 is a schematic representation of an apparatus to protect a pneumatic vacuum elevator from an overload condition in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

To promote an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to an apparatus to protect a pneumatic vacuum elevator from an overload condition. The apparatus includes a vacuum control unit positioned adjacent to one or more vertically stacked cylinders of the pneumatic vacuum elevator. The vacuum control unit is connected to a top cylinder of the one or more vertically stacked cylinders through one or more pipes. The one or more pipes are adapted to function as at least an inlet and an outlet with respect to the top cylinder. The vacuum control unit includes one or more vacuum motors adapted to suck air from the top cylinder through the one or more pipes to move a cabin placed inside the one or more vertically stacked cylinders in an upward direction by creating a vacuum inside the one or more vertically stacked cylinders. The vacuum control unit also includes a flow controller adapted to introduce air into the top cylinder through the one or more pipes to move the cabin in a downward direction. The apparatus also includes an overload tripper positioned adjacent to the flow controller. The overload tripper is adapted to isolate the one or more vacuum motors and the flow controller from a power source when weight of the cabin exceeds a predefined threshold, thereby protecting the pneumatic vacuum elevator from the overload condition. The apparatus further includes a plurality of cutouts located adjacent to the overload tripper and positioned on the vacuum control unit. The plurality of cutouts are adapted to enable bidirectional flow of the air between the one or more pipes and an external environment to support a motion of the cabin in at least one of the upward direction and the downward direction.

FIG. 1 is a schematic representation of an apparatus 10 to protect a pneumatic vacuum elevator 20 from an overload condition in accordance with an embodiment of the present disclosure. The apparatus 10 includes a vacuum control unit 30 positioned adjacent to one or more vertically stacked cylinders 40 of the pneumatic vacuum elevator 20. In one embodiment, the vacuum control unit 30 may be mounted on a wall 170. The vacuum control unit 30 is connected to a top cylinder 50 of the one or more vertically stacked cylinders 40 through one or more pipes 60. In one embodiment, the one or more pipes 60 may be connected to the top cylinder 50 through a sealing plate 150.

Further, the one or more pipes 60 are adapted to function as at least an inlet and an outlet with respect to the top cylinder 50. In one embodiment, the one or more pipes may be composed of poly vinyl chloride (PVC). The vacuum control unit 30 includes one or more vacuum motors 70 adapted to suck air from the top cylinder 50 through the one or more pipes 60 to move a cabin 80 placed inside the one or more vertically stacked cylinders 40 in an upward direction by creating a vacuum inside the one or more vertically stacked cylinders 40.

Furthermore, the vacuum control unit 30 includes a flow controller 90 adapted to introduce air into the top cylinder 50 through the one or more pipes 60 to move the cabin 80 in a downward direction. The apparatus 10 also includes an overload tripper 100 positioned adjacent to the flow controller 90. The overload tripper 100 is adapted to isolate the one or more vacuum motors 60 and the flow controller 90 from a power source (not shown in FIG. 1) when weight of the cabin 80 exceeds a predefined threshold, thereby protecting the pneumatic vacuum elevator 20 from the overload condition. In one embodiment, the power source may be an alternating current source. In a specific embodiment, the power source may be a direct current source. In an exemplary embodiment, the predefined threshold may include 210 kilograms. In another exemplary embodiment, the predefined threshold may include 300 kilograms. Top view 210, front side view 220, back side view 230 of the vacuum control unit 30 is also provided.

Moreover, in one embodiment, the apparatus 10 may include at least four legs 140 to mount the apparatus 10 at a location adjacent to the pneumatic vacuum elevator 20. In one embodiment, the one or more vacuum motors 70 and the flow controller 90 may be adapted to operate in a mutually exclusive order. Direction of flow 180 of the air from the one or more vacuum motors 70 to an external environment and towards the flow controller 90 from the external environment is also shown.

Figure 2:
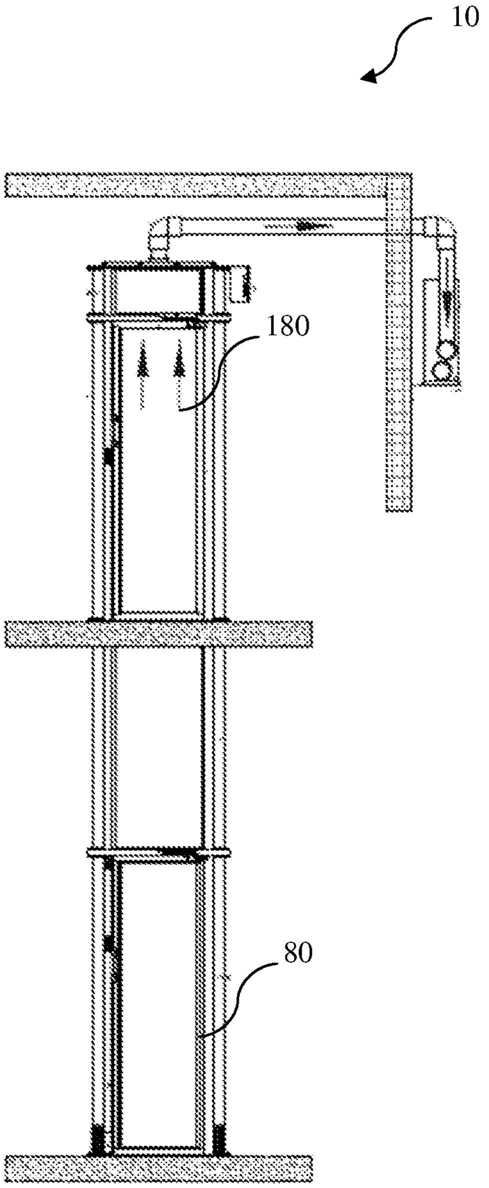
FIG. 2 is a schematic representation of one embodiment of the apparatus of FIG. 1, depicting a direction of flow of air when a cabin is moving in an upward direction in accordance with an embodiment of the present disclosure.

FIG. 2 is a schematic representation of one embodiment of the apparatus 10 of FIG. 1, depicting the direction of flow 180 of the air when the cabin 80 is moving in the upward direction in accordance with an embodiment of the present disclosure. Movement of the cabin 80 in the upward direction is explained in detail in FIG. 1 description.

Figure 3:
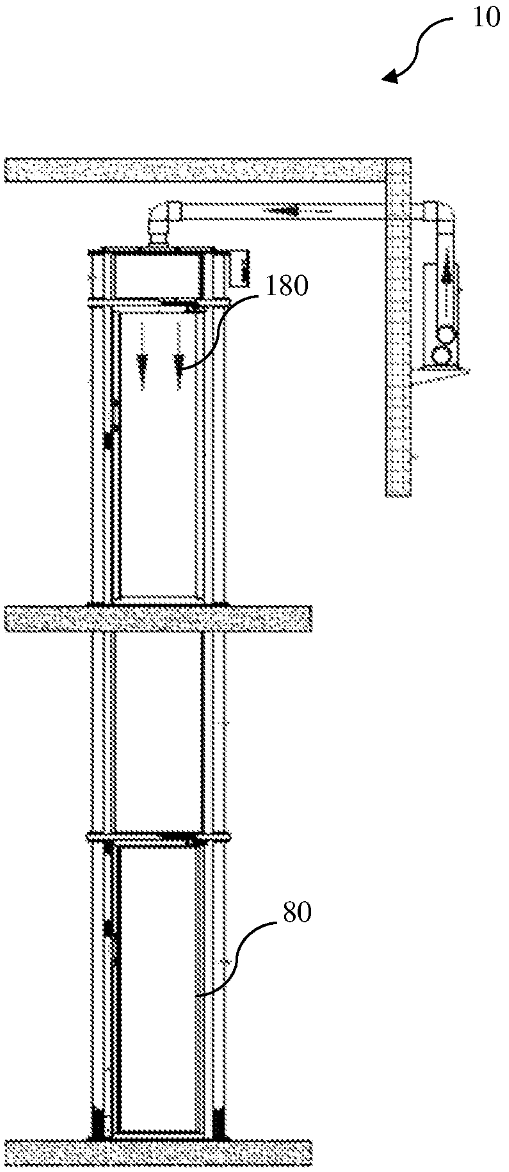
FIG. 3 is a schematic representation of another embodiment of the apparatus of FIG. 1, depicting the direction of flow of the air when the cabin is moving in a downward direction in accordance with an embodiment of the present disclosure.

FIG. 3 is a schematic representation of another embodiment of the apparatus 10 of FIG. 1, depicting the direction of flow 180 of the air when the cabin 80 is moving in the downward direction in accordance with an embodiment of the present disclosure. Movement of the cabin 80 in the downward direction is explained in detail in FIG. 1 description.

Figure 4:
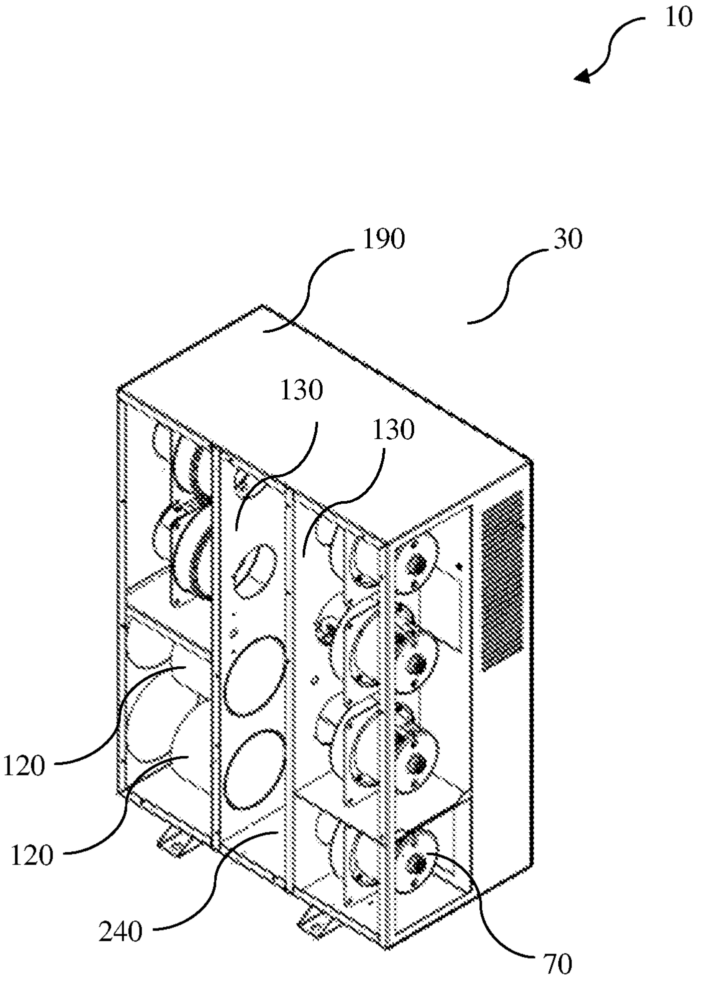
FIG. 4 is a schematic representation of yet another embodiment of the apparatus of FIG. 1, depicting an isometric view of the apparatus with an enclosure in accordance with an embodiment of the present disclosure.

FIG. 4 is a schematic representation of yet another embodiment of the apparatus 10 of FIG. 1, depicting an isometric view of the apparatus 10 with an enclosure 190 in accordance with an embodiment of the present disclosure. In one embodiment, the vacuum control unit 30 may include a plurality of connecting pipes 120 located inside the vacuum control unit 30. In such an embodiment, the plurality of connecting pipes 120 may be adapted to interface the vacuum control unit 30 with the one or more pipes 60. In one embodiment, the one or more vacuum motors 70, and the flow controller 90 may be compartmentalized by a plurality of partition structures 130 to reduce noise. In such an embodiment, the plurality of partition structures 130 may be covered by one or more layers of an absorption foam (not shown in FIG. 4) to absorb noise. In one embodiment, the apparatus 10 may include the absorption foam (not shown in FIG. 4) positioned below the one or more vacuum motors 70 and the flow controller 90 to absorb noise. In one embodiment, an airflow chamber 240 located in the vacuum control unit 30 may be adapted to guide the air sucked by the one or more vacuum motors 70 to the external environment.

Figure 5:
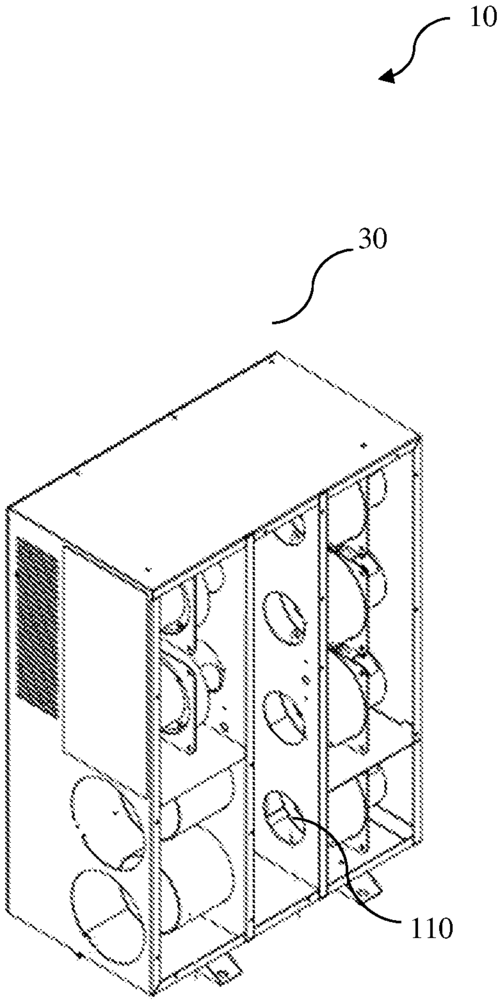
FIG. 5 is a schematic representation of yet another embodiment of the apparatus of FIG. 1, depicting a plurality of cutouts in accordance with an embodiment of the present disclosure.

FIG. 5 is a schematic representation of yet another embodiment of the apparatus 10 of FIG. 1, depicting a plurality of cutouts 110 in accordance with an embodiment of the present disclosure. The apparatus 10 further includes a plurality of cutouts 110 located adjacent to the overload tripper 100 and positioned in the vacuum control unit 30. The plurality of cutouts 110 are adapted to enable bidirectional flow of the air between the one or more pipes 60 and the external environment to support a motion of the cabin 80 in at least one of the upward direction and the downward direction. In such an embodiment, the plurality of cutouts 110 may include one or more unidirectional valves (not shown in FIG. 5) adapted to restrict the airflow from the external environment towards the one or more vacuum motors 70 when the one or more vacuum motors 70 is in an inoperative state. In such an embodiment, the one or more unidirectional valves may include a hinge valve.

Figure 6:
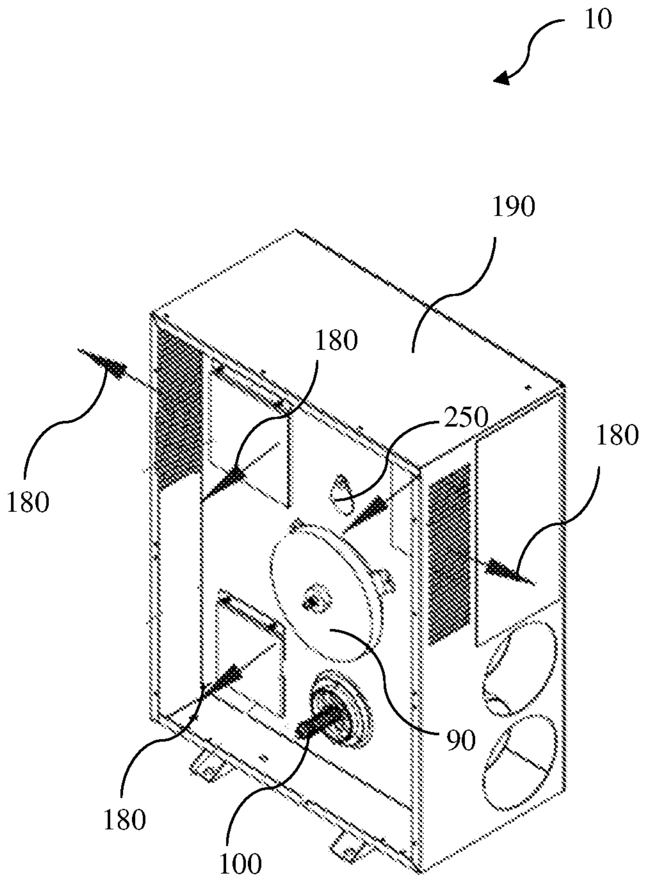
FIG. 6 is a schematic representation of yet another embodiment of the apparatus of FIG. 1, depicting operational arrangement of a flow controller and an overload tripper in accordance with an embodiment of the present disclosure.

FIG. 6 is a schematic representation of yet another embodiment of the apparatus 10 of FIG. 1, depicting operational arrangement of the flow controller 90 and the overload tripper 100 in accordance with an embodiment of the present disclosure. In one embodiment, the flow controller 90 may be positioned in the vacuum control unit 30, through at least on of the plurality of cutouts 110 provided in the vacuum control unit 30. In some embodiments, an air flow adjuster 250 may be positioned adjacent to the flow controller 90 to control the flow of air through the flow controller 90 to adjust a rate of descent of the cabin 80. In such an embodiment, the overload tripper 100 may be positioned beneath the flow controller 90. In one embodiment, the overload tripper 100 may be a pneumatic actuator. The direction of flow 180 of the air from the vacuum control unit 30 to the external environment is also provided. In one embodiment, at least one support channel (not shown in FIG. 6) is provided on the enclosure 190 to provide structural strength to the enclosure 190.

Figure 7:
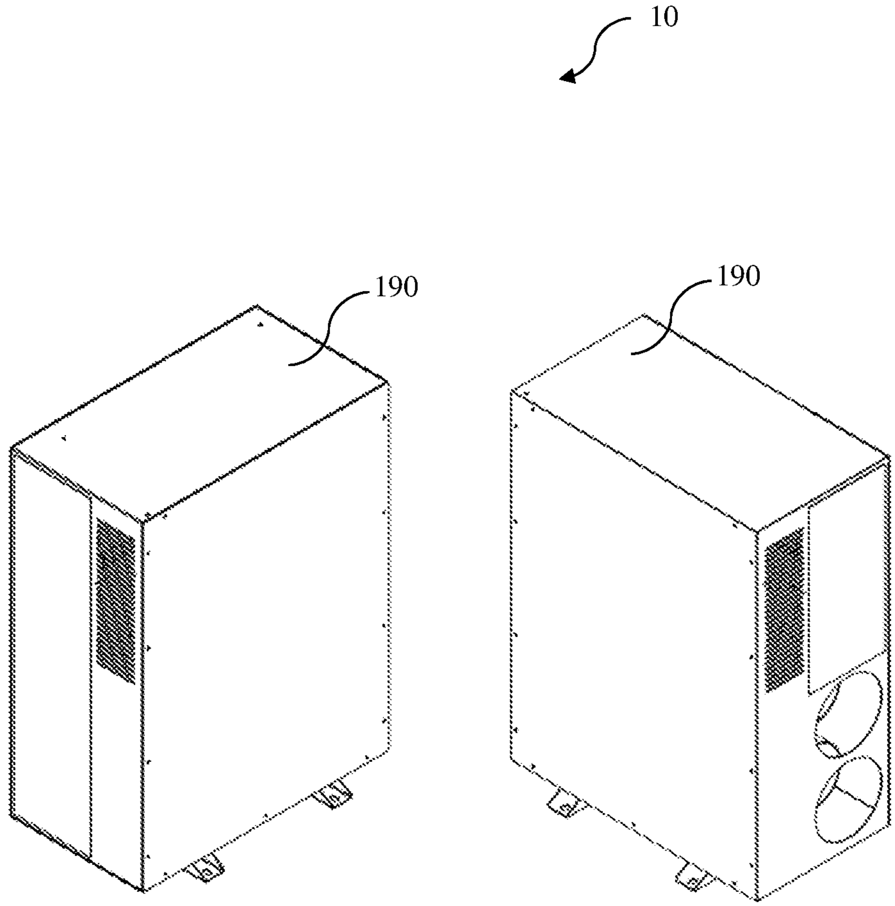
FIG. 7 is a schematic representation of yet another embodiment of the apparatus of FIG. 1, depicting an enclosure of the apparatus in accordance with an embodiment of the present disclosure.

FIG. 7 is a schematic representation of yet another embodiment of the apparatus 10 of FIG. 1, depicting an enclosure of the apparatus 10 in accordance with an embodiment of the present disclosure. The detailed description of the apparatus 10 is provided along with the FIG. 1 description.

Various embodiments of the apparatus to protect a pneumatic vacuum elevator from an overload condition described above enable various advantages. Provision of the overload tripper is capable of preventing entry of the air into the flow controller when the weight of the cabin exceeds the predefined threshold, thereby reducing chances of accidents. The one or more vacuum motors and the flow controller are capable of regulating the vacuum inside the one or more vertically stacked cylinders of the pneumatic vacuum elevator, thereby enabling accurate landing of the cabin at the predefined floor levels. Positioning of the apparatus away from the top cylinder provides a way for mounting the pneumatic vacuum elevator where overhead space is limited.

Further, provision of the second projection provided on the second wall is capable of restricting the one or more relative movements of the beading with respect to the second wall, thereby enabling the beading to exert uniform pressure on the covering sheet. Also, the one or more saw tooth slits provided on the beading prevents one or more relative movements between the beading and the covering sheet, thereby providing superior sealing between the beading and the covering sheet.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and is not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. An apparatus 10 to protect a pneumatic vacuum elevator 20 from an overload condition comprising:

a vacuum control unit 30 positioned adjacent to one or more vertically stacked cylinders 40 of the pneumatic vacuum elevator 20, wherein the vacuum control unit 30 is connected to a top cylinder 50 of the one or more vertically stacked cylinders 40 through one or more pipes 60, wherein the one or more pipes 60 are adapted to function as at least an inlet and an outlet with respect to the top cylinder 50, wherein the vacuum control unit 30 comprises:

one or more vacuum motors 70 adapted to suck air from the top cylinder 50 through the one or more pipes 60 to move a cabin 80 placed inside the one or more vertically stacked cylinders 40 in an upward direction by creating a vacuum inside the one or more vertically stacked cylinders 40;

a flow controller 90 adapted to introduce air into the top cylinder 50 through the one or more pipes 60 to move the cabin 80 in a downward direction;

characterized in that:

an overload tripper 100 positioned adjacent to the flow controller 90, wherein the overload tripper 100 is adapted to isolate the one or more vacuum motors 60 and the flow controller 90 from a power source when weight of the cabin 80 exceeds a predefined threshold, thereby protecting the pneumatic vacuum elevator 20 from the overload condition; and a plurality of cutouts 110 located adjacent to the overload tripper 100 and positioned on the vacuum control unit 30, wherein the plurality of cutouts 110 are adapted to enable bidirectional flow of the air between the one or more pipes 60 and an external environment to support a motion of the cabin 80 in at least one of the upward direction and the downward direction.

2. The apparatus 10 as claimed in claim 1, wherein the vacuum control unit 30 comprises a plurality of connecting pipes 120 located inside the vacuum control unit 30, wherein the plurality of connecting pipes 120 are adapted to interface the vacuum control unit 30 with the one or more pipes 60.

3. The apparatus 10 as claimed in claim 1, wherein the one or more vacuum motors 70, and the flow controller 90 are compartmentalized by a plurality of partition structures 130 to reduce noise.

4. The apparatus 10 as claimed in claim 3, wherein the plurality of partition structures 130 are covered by one or more layers of an absorption foam to absorb noise.

5. The apparatus 10 as claimed in claim 1, comprising at least four legs 140 to mount the apparatus 10 at a location adjacent to the pneumatic vacuum elevator 20.

6. The apparatus 10 as claimed in claim 1, wherein the one or more pipes 60 are connected to the top cylinder 50 through a sealing plate 150.

7. The apparatus 10 as claimed in claim 1, wherein the one or more vacuum motors 70 and the flow controller 90 are adapted to operate in a mutually exclusive order.

8. The apparatus 10 as claimed in claim 1, wherein the plurality of cutouts 110 comprises one or more unidirectional valves positioned above the one or more vacuum motors 70 to restrict the airflow from the external environment towards the one or more vacuum motors 70.

9. The apparatus 10 as claimed in claim 8, wherein the one or more unidirectional valves comprises a hinge valve.

10. The apparatus 10 as claimed in claim 1, comprising an absorption foam positioned below the one or more vacuum motors 70 and the flow controller 90 to absorb noise.

* * * * *